(12) United States Patent
Vawter

(10) Patent No.: US 9,704,327 B2
(45) Date of Patent: Jul. 11, 2017

(54) MULTI-FUNCTION TRANSACTION DEVICE

(75) Inventor: Jamison Vawter, Freehold, NJ (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1344 days.

(21) Appl. No.: 13/005,118

(22) Filed: Jan. 12, 2011

(65) Prior Publication Data
US 2011/0105022 A1 May 5, 2011

Related U.S. Application Data

(63) Continuation of application No. 11/465,271, filed on Aug. 17, 2006, now Pat. No. 7,886,962.

(51) Int. Cl.
G06Q 20/30 (2012.01)
G06Q 20/10 (2012.01)
G06Q 20/14 (2012.01)
G06Q 20/18 (2012.01)
G06Q 20/36 (2012.01)
G06F 7/10 (2006.01)
G07F 7/10 (2006.01)
G06Q 20/12 (2012.01)
G06Q 20/32 (2012.01)
G06Q 20/00 (2012.01)
G06Q 20/38 (2012.01)

(52) U.S. Cl.
CPC .............. G07F 7/10 (2013.01); G06Q 20/00 (2013.01); G06Q 20/10 (2013.01); G06Q 20/102 (2013.01); G06Q 20/12 (2013.01); G06Q 20/145 (2013.01); G06Q 20/18 (2013.01); G06Q 20/32 (2013.01); G06Q 20/325 (2013.01); G06Q 20/3278 (2013.01); G06Q 20/3674 (2013.01); G06Q 20/382 (2013.01)

(58) Field of Classification Search
CPC ...... G06Q 20/10; G06Q 20/102; G06Q 20/12; G06Q 20/145; G06Q 20/18; G06Q 20/32; G06Q 20/325; G06Q 20/3278; G06Q 20/3674; G06Q 20/00; G06F 7/10
See application file for complete search history.

(56) References Cited

U.S. PATENT DOCUMENTS

| 6,084,528 | A | 7/2000 | Beach et al. |
|---|---|---|---|
| 7,040,533 | B1 | 5/2006 | Ramachandran |
| 7,194,438 | B2 | 3/2007 | Sovio et al. |
| 7,330,714 | B2 | 2/2008 | Rosenberg |
| 7,708,194 | B2 | 5/2010 | Vawter |
| 7,748,618 | B2 * | 7/2010 | Vawter .......................... 235/380 |
| 7,774,076 | B2 * | 8/2010 | Skowronek ..................... 700/44 |

(Continued)

Primary Examiner — Daniel Walsh

(57) ABSTRACT

A mobile communication device may include one or more devices configured to: receive, from a server, identity information corresponding to transaction information stored on the server, the transaction information being associated with at least one transaction completed between the mobile communication device and a user device; send, to a transaction device, the identity information to establish a communication session to conduct a transaction between the transaction device and the mobile communication device; and receive, from the transaction device, a payment request associated with the transaction between the transaction device and the mobile communication device, and generated using the transaction information provided by the server.

18 Claims, 12 Drawing Sheets

(56) References Cited

U.S. PATENT DOCUMENTS

| | | | |
|---|---|---|---|
| 8,244,631 B2* | 8/2012 | Ueno et al. | 705/39 |
| 2001/0014870 A1 | 8/2001 | Saito et al. | |
| 2001/0051915 A1* | 12/2001 | Ueno | G06Q 20/04 |
| | | | 705/39 |
| 2002/0059147 A1 | 5/2002 | Ogasawara | |
| 2002/0107745 A1 | 8/2002 | Loeser | |
| 2002/0123359 A1* | 9/2002 | Wei et al. | 455/466 |
| 2002/0130176 A1* | 9/2002 | Suzuki | G06Q 20/02 |
| | | | 235/380 |
| 2002/0147913 A1* | 10/2002 | Lun Yip | 713/184 |
| 2002/0152178 A1* | 10/2002 | Lee | 705/67 |
| 2002/0170961 A1 | 11/2002 | Dickson et al. | |
| 2002/0181710 A1* | 12/2002 | Adam | G06Q 20/02 |
| | | | 380/270 |
| 2003/0055792 A1* | 3/2003 | Kinoshita | G06Q 20/04 |
| | | | 705/67 |
| 2003/0061167 A1* | 3/2003 | Mann et al. | 705/64 |
| 2003/0078844 A1* | 4/2003 | Takatori | G06Q 20/04 |
| | | | 705/17 |
| 2003/0119485 A1 | 6/2003 | Ogasawara | |
| 2003/0130902 A1 | 7/2003 | Athwal | |
| 2003/0132298 A1* | 7/2003 | Swartz | G06K 17/00 |
| | | | 235/472.02 |
| 2003/0135470 A1* | 7/2003 | Beard | G06Q 20/04 |
| | | | 705/67 |
| 2004/0030601 A1* | 2/2004 | Pond | B67D 7/145 |
| | | | 705/16 |
| 2004/0059671 A1* | 3/2004 | Nozaki et al. | 705/39 |
| 2004/0148253 A1 | 7/2004 | Shin et al. | |
| 2004/0254890 A1* | 12/2004 | Sancho et al. | 705/67 |
| 2004/0267618 A1 | 12/2004 | Judicibus et al. | |
| 2005/0017068 A1* | 1/2005 | Zalewski | G06Q 20/04 |
| | | | 235/380 |
| 2005/0131838 A1 | 6/2005 | Woodward | |
| 2005/0171909 A1* | 8/2005 | Woo et al. | 705/44 |
| 2005/0187873 A1* | 8/2005 | Labrou | G06Q 20/02 |
| | | | 705/40 |
| 2005/0187882 A1 | 8/2005 | Sovio et al. | |
| 2005/0259797 A1* | 11/2005 | Swartz et al. | 379/93.12 |
| 2006/0175403 A1 | 8/2006 | Van Fossen McConnell et al. | |
| 2006/0224470 A1* | 10/2006 | Garcia Ruano | G06Q 20/04 |
| | | | 705/26.1 |
| 2006/0288406 A1 | 12/2006 | Kuhn et al. | |
| 2007/0022058 A1* | 1/2007 | Labrou | G06Q 20/32 |
| | | | 705/67 |
| 2007/0038581 A1* | 2/2007 | Keresman | G06Q 20/12 |
| | | | 705/64 |
| 2007/0130085 A1* | 6/2007 | Zhu | 705/75 |
| 2008/0035724 A1* | 2/2008 | Vawter | G06Q 20/20 |
| | | | 235/380 |
| 2008/0041936 A1* | 2/2008 | Vawter | G06Q 20/00 |
| | | | 235/380 |
| 2008/0041937 A1* | 2/2008 | Vawter | G06Q 20/367 |
| | | | 235/380 |
| 2008/0048022 A1* | 2/2008 | Vawter | G06Q 20/32 |
| | | | 235/380 |
| 2008/0052091 A1* | 2/2008 | Vawter | G06Q 20/10 |
| | | | 705/39 |
| 2008/0052232 A1 | 2/2008 | Myers et al. | |
| 2008/0099552 A1 | 5/2008 | Grillion | |
| 2008/0116264 A1 | 5/2008 | Hammad et al. | |
| 2008/0126251 A1* | 5/2008 | Wassingbo | G06Q 20/04 |
| | | | 705/44 |
| 2008/0132167 A1 | 6/2008 | Bent et al. | |
| 2009/0090783 A1* | 4/2009 | Killian | G06Q 20/0855 |
| | | | 235/492 |
| 2009/0112765 A1* | 4/2009 | Skowronek | 705/44 |
| 2009/0144161 A1* | 6/2009 | Fisher | 705/16 |
| 2009/0171760 A1 | 7/2009 | Aarnio et al. | |
| 2010/0125510 A1* | 5/2010 | Smith et al. | 705/17 |
| 2010/0274678 A1* | 10/2010 | Rolf et al. | 705/17 |
| 2010/0320266 A1* | 12/2010 | White | G06Q 20/20 |
| | | | 235/375 |
| 2011/0055413 A1* | 3/2011 | Lobsenz | G06Q 10/06 |
| | | | 709/231 |
| 2011/0125598 A1* | 5/2011 | Shin | G06Q 10/10 |
| | | | 705/17 |
| 2011/0251892 A1* | 10/2011 | Laracey | G06Q 30/0253 |
| | | | 705/14.51 |
| 2012/0095853 A1* | 4/2012 | von Bose et al. | 705/16 |
| 2012/0109693 A1* | 5/2012 | Smith | G06Q 20/204 |
| | | | 705/4 |
| 2012/0130832 A1* | 5/2012 | Bellamy et al. | 705/18 |
| 2012/0215649 A1* | 8/2012 | De Judicibus et al. | 705/21 |
| 2012/0290376 A1* | 11/2012 | Dryer | G06Q 20/3278 |
| | | | 705/14.23 |
| 2013/0046634 A1* | 2/2013 | Grigg | G06Q 30/00 |
| | | | 705/14.58 |
| 2013/0046635 A1* | 2/2013 | Grigg | G06Q 30/0238 |
| | | | 705/14.58 |
| 2013/0066698 A1* | 3/2013 | Levy et al. | 705/14.17 |
| 2013/0151402 A1* | 6/2013 | Howard | G06Q 20/16 |
| | | | 705/40 |
| 2013/0218721 A1* | 8/2013 | Borhan et al. | 705/26.41 |
| 2013/0238455 A1* | 9/2013 | Laracey | G06Q 20/108 |
| | | | 705/21 |
| 2013/0254028 A1* | 9/2013 | Salci | G06Q 20/12 |
| | | | 705/14.53 |
| 2014/0006195 A1* | 1/2014 | Wilson | 705/21 |
| 2014/0074634 A1* | 3/2014 | Afana | 705/16 |
| 2014/0122270 A1* | 5/2014 | Argue et al. | 705/21 |
| 2014/0164254 A1* | 6/2014 | Dimmick | 705/71 |
| 2014/0201086 A1* | 7/2014 | Gadotti et al. | 705/72 |
| 2014/0214670 A1* | 7/2014 | McKenna | G06Q 20/40145 |
| | | | 705/44 |
| 2014/0297533 A1* | 10/2014 | Mittal | G06Q 20/325 |
| | | | 705/44 |
| 2014/0304126 A1* | 10/2014 | Kim | G06Q 10/087 |
| | | | 705/28 |
| 2015/0025986 A1* | 1/2015 | Patel | G06Q 30/0207 |
| | | | 705/16 |
| 2015/0120504 A1* | 4/2015 | Todasco | G06Q 20/322 |
| | | | 705/26.61 |
| 2015/0186871 A1* | 7/2015 | Laracey | G06Q 20/3278 |
| | | | 705/41 |
| 2015/0235309 A1* | 8/2015 | Malhotra | G06Q 20/34 |
| | | | 705/35 |
| 2015/0327071 A1* | 11/2015 | Sharma | H04W 12/12 |
| | | | 726/6 |
| 2016/0110718 A1* | 4/2016 | Jajara | G06Q 20/322 |
| | | | 705/44 |
| 2016/0155111 A1* | 6/2016 | Arnald | G06Q 20/12 |
| | | | 705/41 |

* cited by examiner

STORE NAME: WALLY'S MEGA MART — 710

STORE ID: 001-FAIRFAX, VA — 720

LOCATION: 007 BOND PLAZA — 730

TRANSACTION #: 001 — 740

DATE/TIME: MAY 15, 2006 0930 — 750

700

| ITEM (760) | QUANTITY (770) | PRICE (775) | DESCRIPTION (780) |
|---|---|---|---|
| MILK | 1 | $2.99 | 2%, 1 GALLON |
| COOLER | 1 | $15.00 | 24 QUART, IGLOO |
| YOGURT | 5 | $3.75 | DANNON, 4OZ |
| MEAT | 2 LBS | $11.98 | T-BONE |

TOTAL PRICE: $33.72 — 790

FIG. 7

MULTI-FUNCTION TRANSACTION DEVICE

CROSS-REFERENCE TO RELATED APPLICATION

This application is a continuation of U.S. patent application Ser. No. 11/465,271 filed Aug. 17, 2006, the entirety of which is hereby incorporated by reference herein.

BACKGROUND OF THE INVENTION

Individuals may carry mobile communication devices (e.g., cell phones) with them when they travel, e.g., locally, regionally, etc. Cell phones may allow only unsecured communication sessions, such as voice calls or text messages. In addition, cell phones may not be adapted to perform functions such as storing other types of information. As a result, individuals may be unable to participate in secure communication sessions and/or may have to carry other information with them when they travel, such as a hardcopy calendar, a billfold containing credit cards, insurance cards, bank cards, driver's license, frequent shopper card and/or other information, a shopping list, directions to an establishment, etc.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 7 illustrates an exemplary electronic receipt;

DETAILED DESCRIPTION OF PREFERRED EMBODIMENTS

Figure 1A:
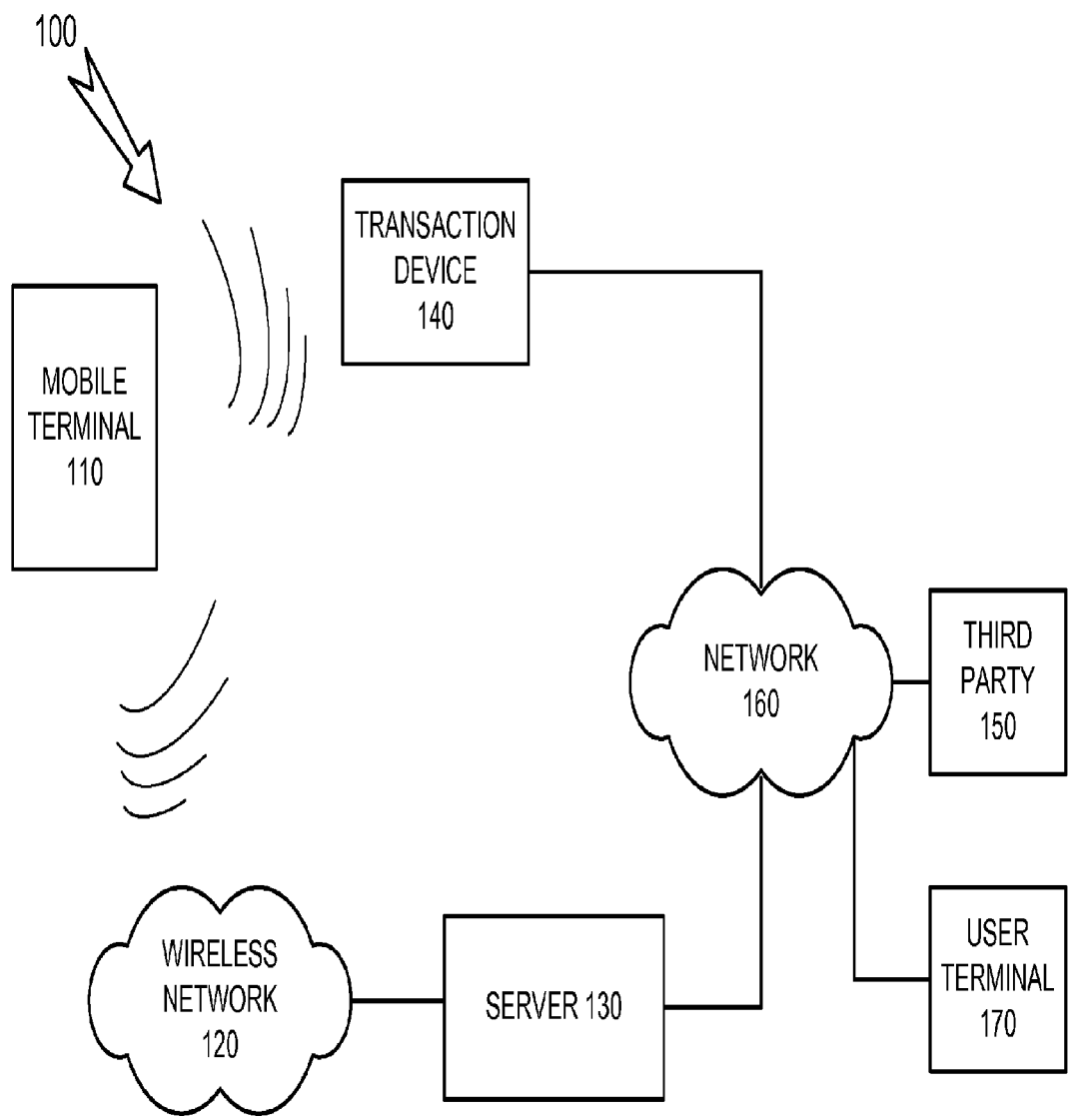
FIG. 1A illustrates an exemplary implementation of a system that can be configured to operate in accordance with principles of the invention.

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may allow parties to perform secure near field wireless transactions therebetween. For example, a customer may use a cell phone to establish a secure communication session with a register in a store via a near field wireless link. The cell phone may receive information contained in the cash register receipt via the wireless link, e.g., a list of purchased items, prices for the items, quantities for the items, etc., and the receipt information may appear on the cell phone display during the transaction.

The customer may send payment to the register via the near field wireless link to purchase items identified on the receipt. The cell phone may store a complete copy of the transaction thereon and/or may send its copy of the transaction to a server for remote storage and/or future recall during the transaction or when the transaction is finished.

The cell phone and the register may be equipped with hardware or software based logic to perform authentication of the other device, to send/receive queries (e.g., a radio frequency identification (RFID) query to initiate a transaction, to send/receive information via a secure near field communication link (e.g., a Bluetooth link), to store transaction information, etc.). In one implementation, logic to allow the cell phone and the register to perform secure near field transactions may be provided via plug-in modules. The plug-in modules may be adapted to convert a device that cannot perform secure near field transactions into a device that can participate in secure near field transactions.

As used herein, "consumer," "customer," "user," and/or "operator" may refer to an individual that can participate in a transaction. A consumer/customer/user/operator may be identified with a device (e.g., a mobile terminal), a group (e.g., employees of a corporation, students at a school, members of a frequent shopper club, etc.), a location (e.g., a neighborhood, city, etc.), etc. "Transaction" may refer to an exchange of information between two parties, such as a customer and a retailer, and/or between two devices operated on behalf of the parties (e.g., a cell phone and an electronic register). A transaction may include a purchase, an exchange, a credit, a request for services, etc. In one implementation, a transaction may include the exchange of monetary information (e.g., electronic money, credit card information, automated teller machine (ATM) information, etc.).

Implementations and processes for secure near field transactions as described herein may be incorporated into various devices and/or systems and/or may be used with a number of techniques, such as those described in patent application Ser. No. 11/466,215 entitled "Party Identification in a Wireless Network", filed Aug. 22, 2006, now U.S. Pat. No. 8,116,734; in patent application Ser. No. 11/465,935, entitled "Secure Near Field Transaction," filed Aug. 21, 2006, now U.S. Pat. No. 7,748,618; in patent application Ser. No. 11/463,326, entitled "Transaction Information Mining," filed Aug. 9, 2006, now U.S. Pat. No. 7,823,772; and in patent application Ser. No. 11/466,544, entitled "Virtual Wallet," filed on Aug. 23, 2006, now U.S. Pat. No. 7,708,194, the content of the above applications are incorporated herein by reference in their entireties, respectively.

FIG. 1A illustrates an exemplary system 100 that can be configured to operate in accordance with principles of the invention. System 100 may include a mobile terminal 110 (hereinafter terminal 110), a wireless network 120, a server 130, a transaction device 140, a third party 150, a network 160, and a user terminal 170.

Terminal 110 may include a device that exchanges information with a destination. For example, terminal 110 may include a handheld device, such as a web-enabled cellular telephone, an Internet protocol (IP) telephone, a personal digital assistant (PDA), a computer, such as a laptop computer, a plain old telephone system (POTS) device, etc.

Other implementations of terminal 110 may include other devices, such as a server and/or another computation or communication device.

In one implementation, terminal 110 may include hardware or software to establish a secure communication session with a destination, such as transaction device 140 and/or wireless network 120. Terminal 110 may be adapted to perform near field wireless communication, e.g., communication over a distance of several inches to a few feet, and/or far field communication, e.g., communication over substantially any distance.

Terminal 110 may be configured to store information about one or more transactions and/or may send and/or receive transaction information to/from another device, such as transaction device 140 and/or server 130. For example, terminal 110 may store information about a purchase transaction, such as information about purchased items, item prices, a location where items were purchased, information about a method of payment, etc. (e.g., via an electronic receipt). Terminal 110 may further store information that can be used in transactions and/or other types of information in a virtual wallet. For example, terminal 110 may store credit card, automated teller machine (ATM) card, driver's license, bank account, and/or other types of information in the virtual wallet. Terminal 110 may send stored information to a destination, such as a remote storage device operating on server 130.

Wireless network 120 may include a network that transfers information. Implementations of wireless network 120 may include cellular networks and/or other types of wireless networks, such as ad hoc wireless networks, free-space optical networks, etc. Wireless network 120 may send and/or receive information via packet-based or non-packet based exchanges. In one implementation, wireless network 120 may be operated by a service provider that provides wireless communication services to a customer, such as a user of terminal 110, as a managed service (e.g., for a monthly fee).

Server 130 may include a device that receives information from, or transmits information to, another device and/or network. For example, server 130 may include a workstation, desktop computer, laptop computer, PDA, web enabled cellular telephone, Wi-Fi device, or another type of network device. Server 130 may run applications, such as server applications, service provisioning applications, authentication and/or authorization applications, database applications, email applications, remote storage applications, communication applications (e.g., wireless communication applications), e-commerce applications, etc.

In one implementation, server 130 may provide a service, such as a managed service, to other devices in system 100, such as terminal 110 and/or third party 150. For example, server 130 may provide communication services to terminal 110, transaction storage services to third party 150 and/or terminal 110, etc. For example, server 130 may be operated by a communication provider and may provide wireless communication services to one or more terminals 110 on a monthly subscription basis. Server 130 may further provide remote transaction storage to one or more terminals 110 and/or one or more user terminals 170. Server 130 may further communicate with terminal 110 on behalf of other devices in system 100, such as third party 150. For example, third party 150 may be a bank that maintains financial accounts for a user of terminal 110. Server 130 may contact terminal 110 on behalf of the bank and may process transactions between terminal 110 and the bank (third party 150). Other implementations of server 130 may provide other functions and/or may provide other services to devices in system 100.

Transaction device 140 may include a device that performs a transaction on behalf of a customer or device. For example, transaction device 140 may include an electronic register operated by a retailer, a transaction server operated by a web-based retailer, a computer operated by a government agency (e.g., a department of motor vehicles), a computer operated by a hospital or doctor's office, etc. Transaction device 140 may communicate with terminal 110 via a near field wireless link while performing a transaction on behalf of terminal 110. Transaction device 140 may further communicate with third party 150 and/or server 130 regarding the transaction, such as by sending transaction details to third party 150 or server 130 via a network, far field wireless link, etc.

Third party 150 may include a device that sends or receives information via network 160. For example, third party 150 may include a server that provides a service to terminal 110, server 130 and/or user terminal 170. In another implementation, third party 150 may include a device that subscribes to a service provided via server 130. Third party 150 may participate in a transaction between terminal 110 and transaction device 140, such as when third party 150 is a device that verifies a credit card number for terminal 110 or transaction device 140. User terminal 170 may be operated by server 130 and/or may be operated by another entity.

Network 160 may include any network capable of transferring information. Implementations of network 160 may include public switched telephone networks (PSTNs), local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), etc.

Network 160 may include network devices, such as routers, switches, firewalls, gateways, and/or servers (not shown). Network 160 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

User terminal 170 may include a device that sends or receives information via network 160. In one implementation, user terminal 170 may be affiliated with a user of terminal 110. For example, user terminal 170 may include a desktop computer that is used to configure a user account on server 130. Information from the configured user account may be mirrored to terminal 110 so that the user can participate in secure near field transactions, such as secure near field purchase transactions with transaction device 140.

Figure 1B:
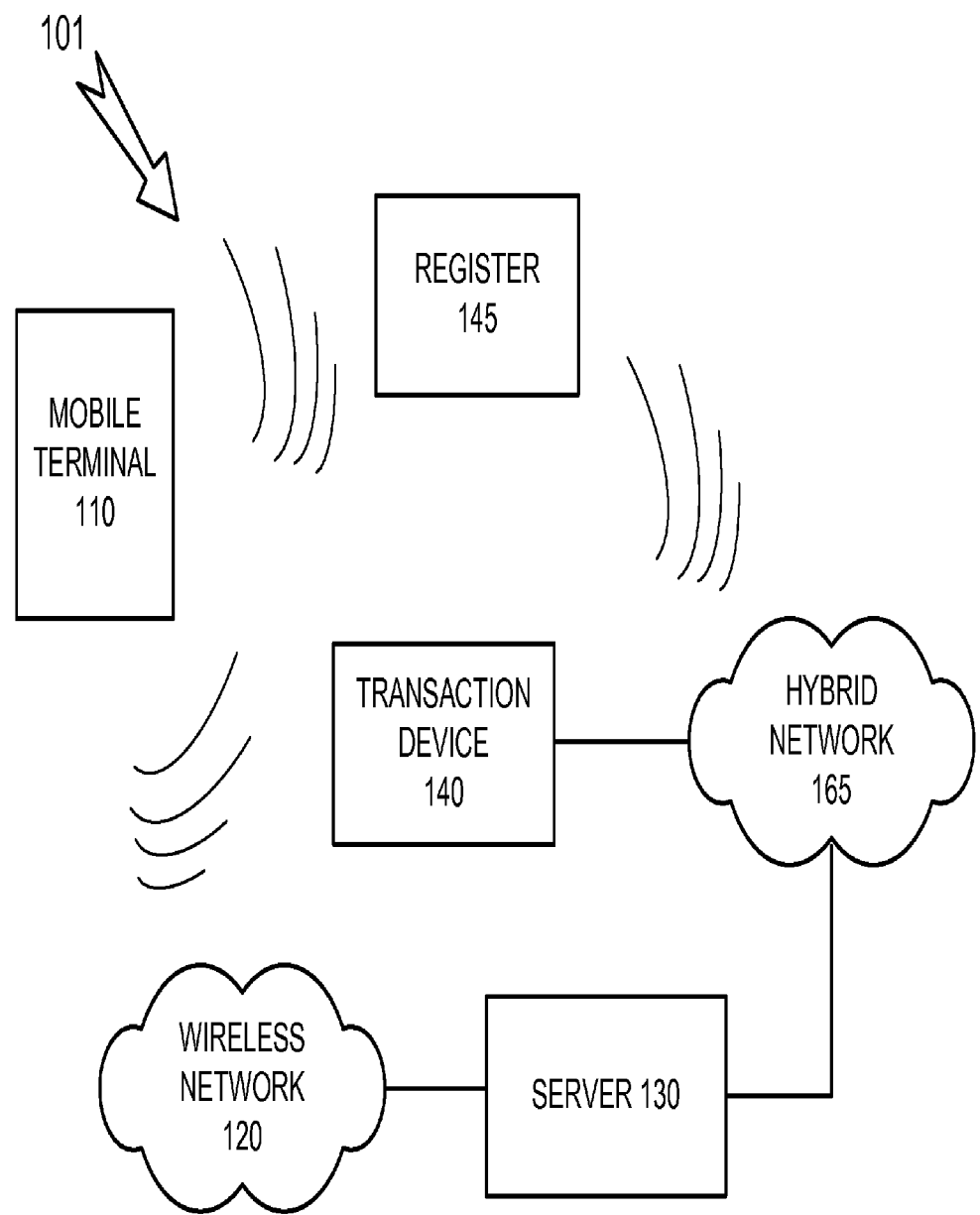
FIG. 1B illustrates a second exemplary implementation of a system that can be configured to operate in accordance with principles of the invention.

FIG. 1B illustrates an alternative implementation of system 100, denoted as system 101. System 101 may include terminal 110, wireless network 120, server 130, transaction device 140, register 145, and hybrid network 165. Terminal 110, wireless network 120, server 130, and transaction device 140 may operate as described in connection with FIG. 1A.

Register 145 may include a device that participates in a transaction with another device in system 101. For example, register 145 may include a cash register that is modified via a plug-in module to allow register 145 to participate in secure wireless transactions with terminal 110 and/or hybrid network 165. Register 145 may exchange information with terminal 110 via a secure near field communication link (e.g., Bluetooth) and may exchange information with hybrid network 165 via a far field wireless communication link (e.g., a cellular link).

Hybrid network 165 may include a network that transfers traffic using two or more techniques. For example, in one implementation, hybrid network 165 may transport information via a public switched telephone network (PSTN) signals, wireless fidelity (Wi-Fi) signals, and/or TCP/IP messages. Other implementations of hybrid network 165 may transport information via other techniques and/or protocols. In one implementation, hybrid network 165 may exchange wireless data with one device (e.g., register 145), identification data with a second device via a hardwired link (e.g., server 130) and/or PSTN data with a third device via a hardwired link or a wireless link (e.g., with transaction device 140 over a twisted pair link).

Figure 2:
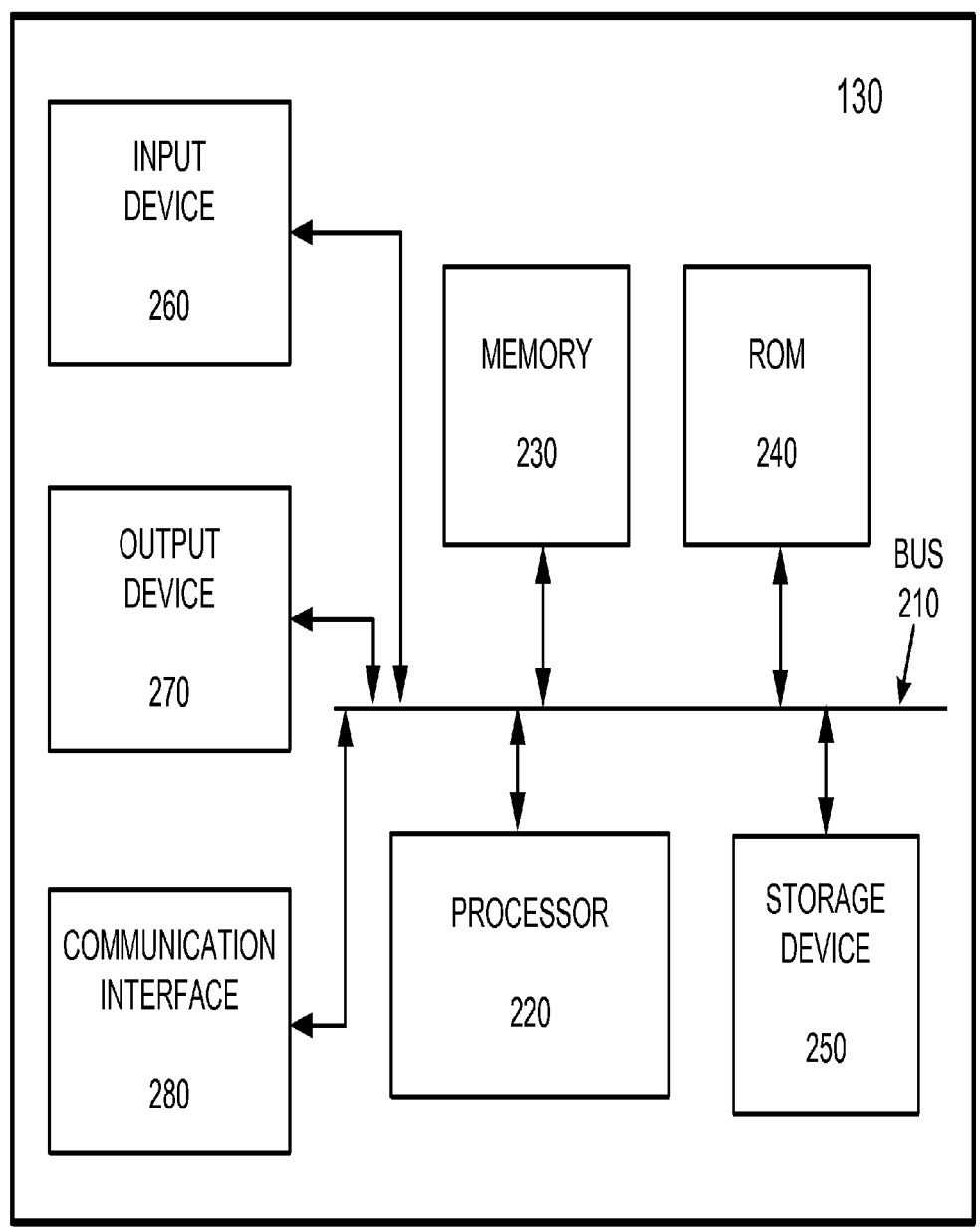
FIG. 2 illustrates an exemplary architecture for implementing the server of FIG. 1.

FIG. 2 illustrates an exemplary architecture for implementing server 130. It will be appreciated that terminal 110, transaction device 140, register 145, third party 150, user terminal 170, and/or other devices (not shown) that can be used in system 100/101 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as terminal 110, transaction device 140, third party 150, and/or user terminal 170. For example, communication interface 280 may include a modem, an Ethernet interface, a wireless interface, and/or a port. Alternatively, communication interface 280 may include other mechanisms for communicating via a network, such as network 160.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Figure 3:
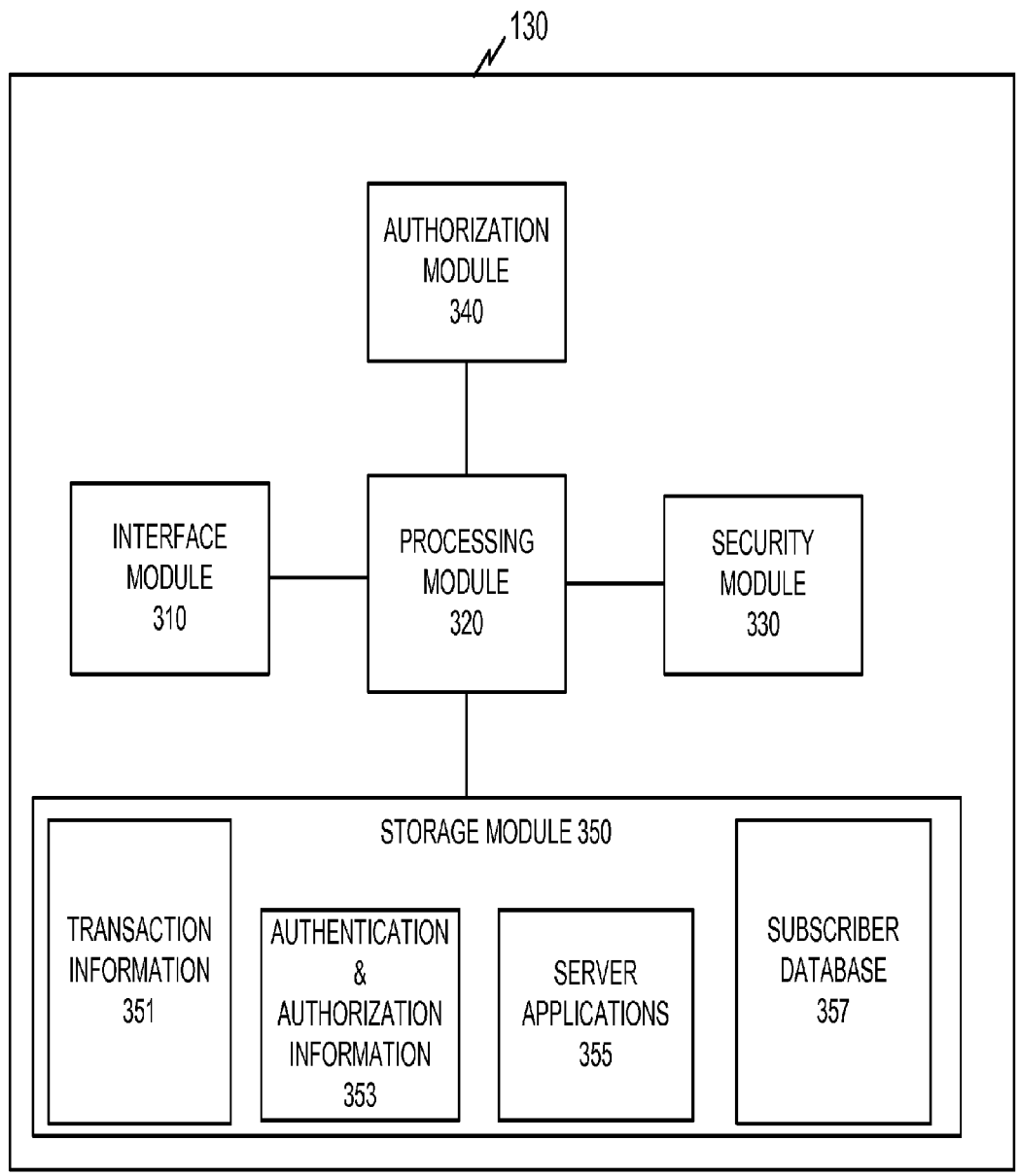
FIG. 3 illustrates an exemplary functional diagram of the server of FIG. 1.

FIG. 3 illustrates an exemplary functional diagram of server 130. Server 130 may implement hardware or software based logic to operate as a service provisioning device, an authorization device, a remote storage device, etc. Implementations of server 130 may operate on behalf of devices on wireless network 120, network 160, and/or hybrid network 165, such as terminal 110, transaction device 140, register 145, third party 150, and/or user terminal 170.

Server 130 may include an interface module 310, a processing module 320, a security module 330, an authorization module 340, and a storage module 350.

Interface module 310 may include hardware or software based logic to send and/or receive information. For example, interface module 310 may include communication logic for server 130 to communicate with mobile terminal 110, transaction device 140, register 145, third party 150 and/or user terminal 170.

In one implementation, first logic may allow server 130 to exchange information with devices on wireless network 120, such as mobile terminal 110. The first logic may include a transceiver that sends and receives wireless data to/from terminal 110 via wireless network 120. The first logic may be adapted to send and receive encrypted information and/or un-encrypted information.

Another implementation may include second logic to allow server 130 to exchange information with devices on network 160, such as transaction device 140, third party 150 and user terminal 170. For example, the second logic may include a network interface configured to exchange encrypted or un-encrypted information with transaction device 140, third party 150, and/or user terminal 170. In still another implementation, third logic may allow server 130 to communicate with devices on hybrid network 165, such as register 145. For example, the third logic may include a wireless network interface card to allow server 130 to send information to register 145. The third logic may further include an interface that allows server 130 to communicate with transaction device 140 via a hardwired link. Interface module 310 may include other types of logic in still other exemplary implementations.

Processing module 320 may include hardware or software based logic to process instructions related to providing services to terminal 110, transaction device 140, register 145, third party 150, and/or user terminal 170, exchanging information with devices in system 100/101, processing data related to transactions for devices in system 100/101, storing transaction information on behalf of devices in system 100/101, etc. Processing module 320 may be implemented in a standalone or distributed configuration, such as by being distributed across one or more devices.

Security module 330 may include logic to generate security mechanisms for use with devices in system 100/101. Security module 330 may generate authorization devices and/or mechanisms, such as passwords, pseudo-random numbers, tokens, biometric identifiers, and/or other types of identifiers to establish an identity of a user or device. For example, security module 330 may generate a seed that is used by code on terminal 110 to generate a password or a pseudo random number. In one implementation, security module 330 may generate an authorization mechanism (e.g., a token or seed) and may send the authorization mechanism to terminal 110 so that terminal 110 can validate its identity to transaction device 140 using the authorization mechanism.

Authorization module 340 may include hardware or software based logic to identify a user of terminal 110 or another device in system 100/101, to identify a device in system 100/101, and/or to determine whether a user/device is authorized to access a destination, participate in a transaction, and/or receive information. Authorization module 340 may receive identification and/or security information from security module 330 and/or other devices in system 100/101. For example, authorization module 340 may receive a token from transaction device 140 (or register 145), where the token was sent from terminal 110 to transaction device 140/register 145 prior to performing a transaction over a secure near field communication link. Authorization module 340 may receive a token copy from security module 330, where security module 330 sent the token to terminal 110 prior to terminal 110 sending the token to transaction device 140/register 145. Authorization module 340 may compare the token to the token copy and may determine that terminal 110 is valid when the token matches the token copy. Implementations of authorization module 340 may operate with encrypted and/or unencrypted information when authorizing a user or device.

Storage module 350 may include hardware or software based logic to store information related to users or devices operated by users or on behalf of users. Storage module 350 may also store user information, transaction information, payment information, account information, virtual wallet information, authentication information, etc. Storage module 350 may be implemented in server 130 and/or may be located remotely with respect to server 130 and connected thereto via a link. Storage module 350 may be implemented in memory 230, ROM 240 and/or storage device 250.

In one implementation, storage module 350 may include transaction information 351, authentication and authorization information 353, server applications 355, and subscriber database 357. Transaction information 351 may include information related to a transaction, such as an exchange of information between two devices in system 100/101. For example, transaction information 351 may include information about authorized merchants (e.g., merchants that can participate in secure near field transactions with terminal 110), items purchased, quantities of items purchased, sizes, shapes, and/or styles of items purchased, date/time information related to a transaction, a transaction identifier, a merchant identifier, a location identifier, etc. Transaction information 351 may be stored on behalf of terminal 110 and/or another device, such as transaction device 140/register 145. Transaction information 351 may include electronic receipts, information about coupons and/or other discounts related to terminal 110, etc.

Authentication and authorization information 353 may include information related to the authentication, authorization, validation, and/or identification of a user and/or device (e.g., terminal 110, transaction device 140, register 145, user terminal 150, etc.) in system 100/101. Authentication and authorization information 353 may include a user name, password, personal identification number (PIN), token, secure ID value, electronic serial number (ESN), certificate, watermark, merchant identifier, transaction identifier, code (e.g., a script), etc. In one implementation, security module 330 may use authentication and authorization information 353 when performing security related functions on behalf of server 130.

Server applications 355 may include software applications residing on server 130. Server applications 355 may include communication applications, database applications, location tracking applications, accounting applications, etc. For example, storage module 350 may store code related to virtual wallet application 340, a web serving application, etc., in server applications 355.

Subscriber database 357 may include information related to subscribers of products and/or services supported by server 130. For example, subscriber database 357 may include information about a user of terminal 110 and/or transaction device 140/register 145. This information may be user information and may include, for example, a name, an address, a phone number, an electronic serial number, a social security number, a driver's license number, passport information, access information, credit card information, debit card information, a receipt, order information, account information, an image, a music file, a contact, a data file, a document, a spreadsheet, a call log, secure personal identification number (PIN) pad logic, or a coupon. Server 130 may maintain information on substantially any number of subscribers. In one implementation, subscriber database 357 may maintain virtual wallets on behalf of subscribers.

Figure 4A:
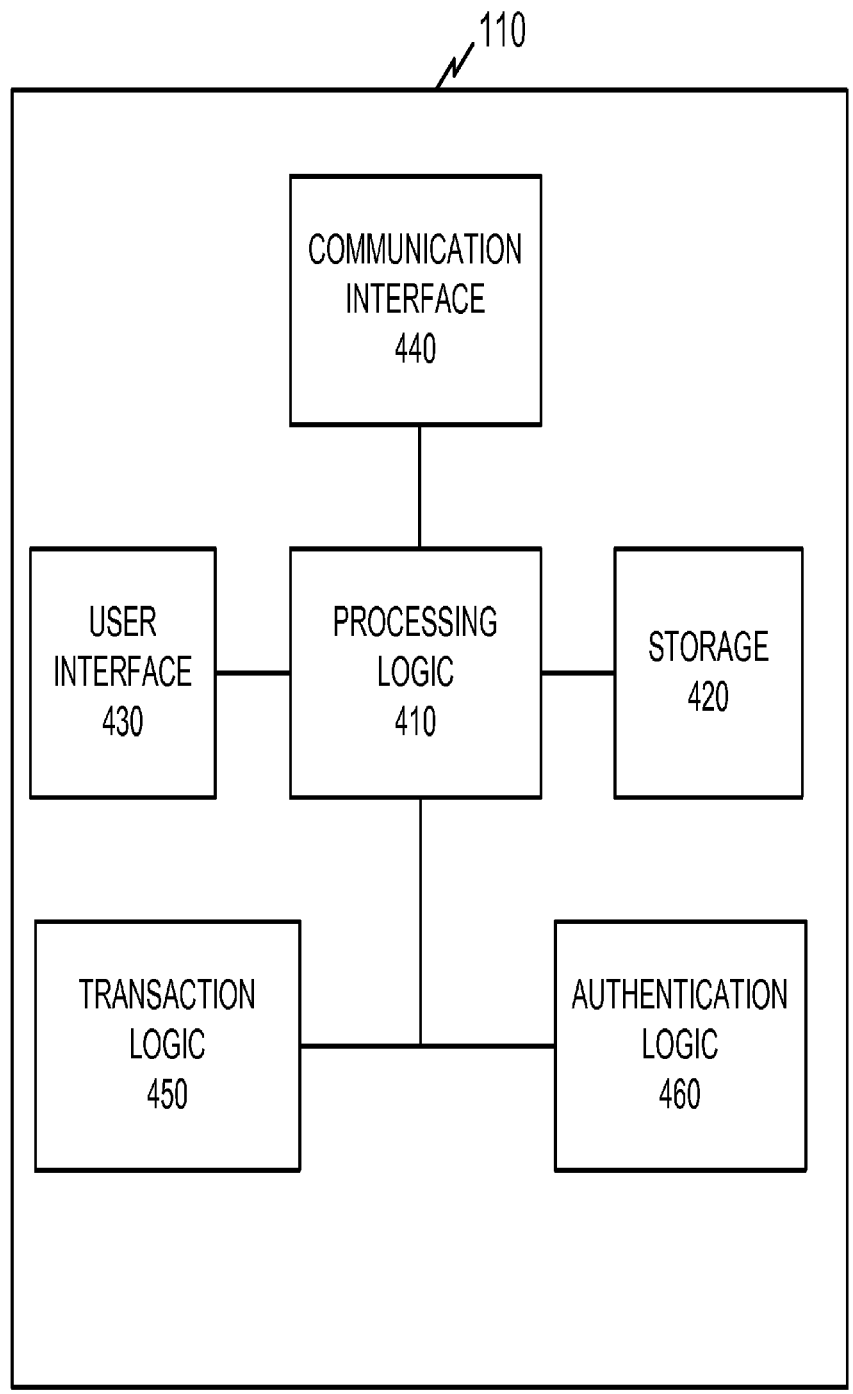
FIGS. 4A and 4B illustrate exemplary functional diagrams of the mobile terminal of FIG. 1.

FIG. 4A illustrates an exemplary functional diagram of terminal 110. An implementation of terminal 110 implemented as shown in diagram 110 may include processing logic 410, storage 420, user interface 430, communication interface 440, transaction logic 450, and authentication logic 460.

Processing logic 410 may include hardware or software to process instructions related to operating terminal 110. For example, processing logic 410 may process instructions to allow terminal 110 to receive a token, to establish a secure communication session with transaction device 140/register 145, to participate in a transaction with transaction device 140/register 145, and/or to establish communication sessions with other devices in system 100/101. Processing logic 410 may be implemented in a standalone or distributed configuration, such as by being distributed across one or more devices.

Storage 420 may include hardware or software based logic to store information related to transactions, payments, accounts, calendars, phone/address books, images, text, music, navigation applications, etc. Storage 420 may be implemented locally in terminal 110 and/or may be located remotely with respect to terminal 110 and connected thereto via a link, e.g., when server 130 provides remote storage capabilities to terminal 110.

In one implementation, storage 420 may be adapted to operate as a virtual wallet for a user of terminal 110. For example, storage 420 may store information that might be maintained in a conventional wallet, such as social security numbers, driver's license information, credit cards, automated teller machine (ATM) cards, club membership cards, currency (e.g., electronic money), etc. For example, terminal 110 may retrieve credit card information from the virtual wallet to conclude a purchasing transaction with transaction device 140/register 145.

User interface 430 may include hardware or software based logic that allows a user to interact with terminal 110. User interface 430 may include a keypad or other input device, a display, a speaker, a microphone, a tactile actuator (e.g., a vibrating device), control keys, etc. For example, user interface 430 may display mirrored data received from transaction device 140/register 145 onto a display device of terminal 110 during a transaction.

Communication interface 440 may include hardware or software based logic that allows terminal 110 to communicate with other devices. Implementations of communication interface 440 may include an antenna, a transmitter that may convert baseband signals from processing logic 410 to radio frequency (RF) signals and/or a receiver that may convert RF signals from the antenna to baseband signals. Alternatively, communication interface 440 may include a transceiver that performs the functions of both a transmitter and a receiver. Communication interface 440 may operate with other components, such as processing logic 410, user interface 430 (e.g., a display device) and/or authentication logic 460 when establishing a communication session on behalf of terminal 110.

Communication interface 440 may include a near field communication component that allows terminal 110 to participate in communication sessions over short distances, such as distances up to several feet (e.g., on the order of 30 feet) and a far field communication component that allows terminal 110 to participate in communication sessions over substantially any distance (e.g., communicating with a cell tower that is located several miles away from terminal 110 and/or communicating with a satellite).

Assume, for sake of example, that terminal 110 may receive a query from a radio frequency identification (RFID) transmitter on transaction device 140. Terminal 110 may process the signal and communication interface 440 may make information, such as a token that identifies terminal 110, available to transaction device 140 via a near field communication signal. Communication interface 440 may be adapted to send and/or receive communication signals via radio frequency (RF), free-space optical, and/or free-space acoustic waveforms.

Transaction logic 450 may include hardware or software based logic to perform transactions with a device, such as transaction device 140, register 145, or server 130. For example, transaction logic 450 may include a transaction application that allows terminal 110 to establish near field sessions with transaction device 140/register 145 via communication interface 440 and/or to exchange transaction information with transaction device 140/register 145 (e.g., item names, quantities, prices, payment information, etc.). In one implementation, transaction logic 450 may include logic that allows a display device on terminal 110 to mirror items displayed on a display of transaction device 140/register 145. Transaction logic 450 may operate with authentication logic 460, communication interface 440, and/or other components in terminal 110 when initiating, participating in, and/or concluding transactions with devices.

Authentication logic 460 may include hardware or software based logic that allows terminal 110 to establish its identity with another device. Authentication logic 460 may include logic that allows terminal 110 to receive and/or generate a token, such as a string of digits that can be used to identify terminal 110 with respect to other devices in system 100, such as transaction device 140. Authentication logic 460 may further allow a user of terminal 110 to enter information, such as a password, PIN, answer to a prompt, etc. to establish an identity of terminal 110. Implementations of authentication logic 460 may use identity information, such as a name, an address, a phone number, an electronic serial number, a social security number, a driver's license number, passport information, access information, credit card information, debit card information, a receipt identifier, order information, account information, a personal identification number (PIN), a token, a password, a seed, a secure identification value (SIV), a secure ID, or code, to identify terminal 110 and/or a user of terminal 110 to another device in system 100/101.

For example, in an implementation, authentication logic 460 may send a rolling code to a device in response to a query, where the rolling code is adapted to uniquely identify terminal 110 in a way that discourages spoofing by another party, such as a party operating a malicious device (eavesdropper) in system 100. Authentication logic 460 may allow terminal 110 to participate in secure sessions with devices in system 100 when terminal 110 is validated to the devices.

In one implementation, authorization logic 460 may include an RFID chip that includes an electronic serial number (ESN). The RFID chip may receive a query from an RFID transceiver (e.g., a reader and a transmitter) and may provide an ESN to transaction device 140/register 145 in response to the query, where the ESN uniquely identifies terminal 110. An ESN may be combined with other types of identifiers to identify terminal 110 to other devices. For example, in one implementation, terminal 110 may employ a secure identification value (SIV) that may include an ESN, a secure ID token (e.g., a rolling code), and/or a PIN. Terminal 110 may provide the SIV in response to a query, such as an RFID query, to identify terminal 110 to the device sending the query.

In another implementation, authentication logic 460 may include a secure identification (secure ID) value, e.g., a token, that is synchronized with another device, such as server 130. Terminal 110 may provide the secure ID token to transaction device 140/register 145 in response to a request, and transaction device 140/register 145 may verify the token via the other device (e.g., server 130).

In still another implementation, authentication logic 460 may include an RFID scanner, or another type of scanner, to allow terminal 110 to participate in peer-to-peer secure communication sessions. For example, a peer-to-peer secure communication session may occur when terminal 110 exchanges transaction information with a wireless PDA operated by another user, such as user hosting a yard sale.

Figure 4B:
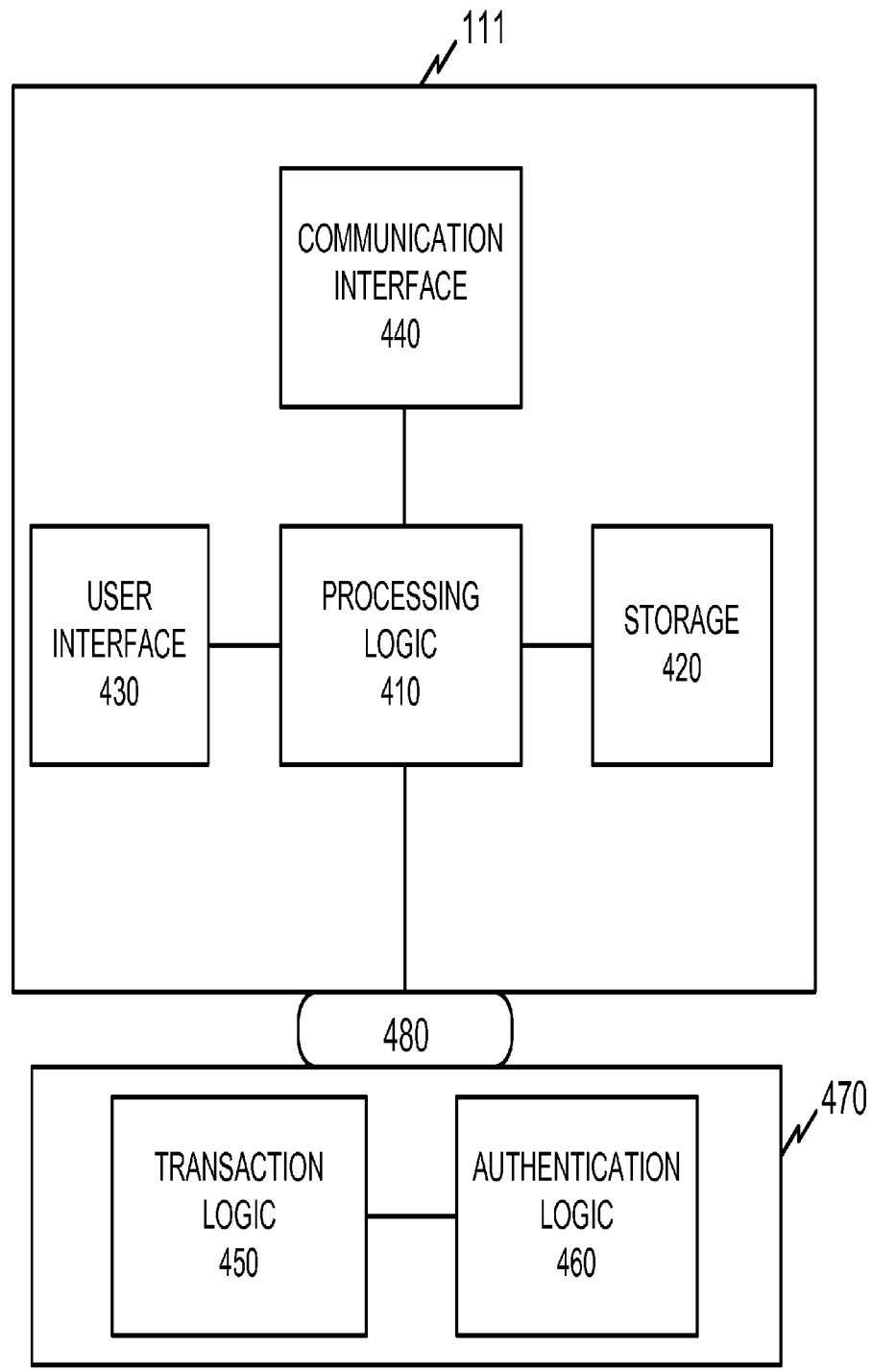

FIG. 4B illustrates an alternative exemplary implementation of a mobile terminal, namely terminal 111. Terminal 111 may include processing logic 410, storage 420, user interface 430, communication interface 440, transaction logic 450, authentication logic 460, plug-in module 470 and interface 480. Processing logic 410, storage 420, user interface 430, communication interface 440, transaction logic 450, and authentication logic 460 may be as described in connection with FIG. 4A.

Plug-in module 470 may include a structure adapted to hold one or more components that may operate with terminal 111. For example, plug-in module 470 may include a housing that contains transaction logic 450 and/or authentication logic 460. Plug-in module 470 may be used to convert a wireless device that cannot participate in secure near field communication sessions into a wireless device (e.g., terminal 111) that can participate in secure near field communication sessions.

Interface 480 may include a device that removeably couples terminal 111 to plug-in module 470. Interface 480 may provide electrical and/or mechanical connectivity between terminal 111 and plug-in module 470.

Figure 5A:
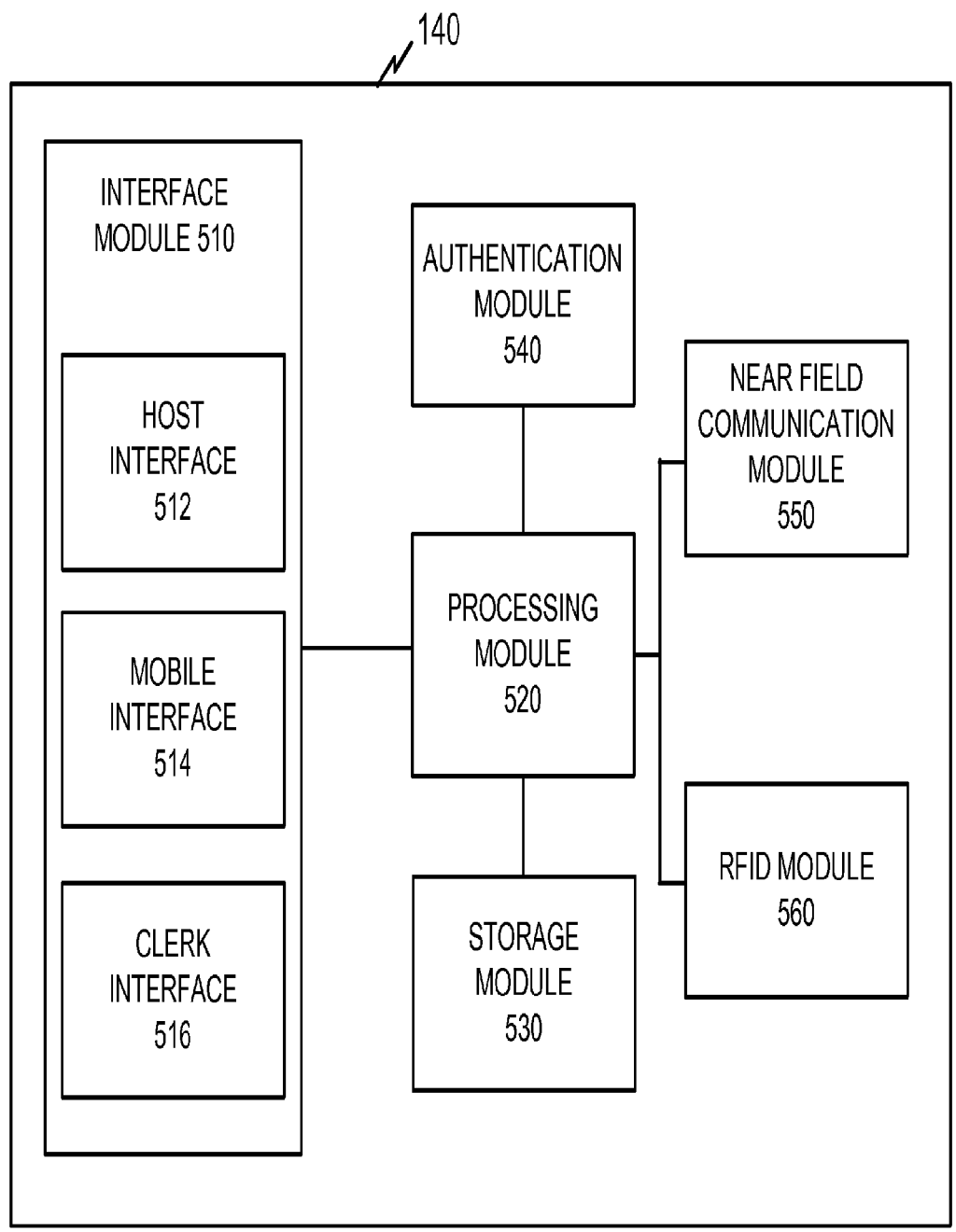
FIGS. 5A and 5B illustrate exemplary functional diagrams of the transaction device of FIG. 1.

FIG. 5A illustrates an exemplary functional diagram of transaction device 140. An implementation of transaction device 140 may be implemented as shown in diagram 140 and may include interface module 510, processing module 520, storage module 530, authentication module 540, near field communication module 550 and radio frequency identification (RFID) module 560. Implementations of register 145 may be configured as shown in FIG. 5A.

Interface module 510 may include hardware or software based logic to send and/or receive information and may include host interface 512, mobile interface 514, and clerk interface 516. Host interface 512 may include hardware or software based logic that allows transaction device 140 to exchange information with a host device such as a server that controls a number of transaction devices 140 (e.g., a server in a store that runs cash registers used to service customers in the store). In an implementation, host interface 512 may connect transaction device 140 to a server via a private network, such as a LAN.

Mobile interface 514 may include hardware or software based logic to exchange information with terminal 110. For example, mobile interface 514 may operate with near field communication module 550 to send information to and/or receive information from terminal 110 during a transaction session. In one implementation, mobile interface 514 may send transaction receipt information to terminal 110 so that the information can appear on a display of terminal 110 during a transaction between terminal 110 and transaction device 140. Mobile interface 514 may also receive payment information and/or other information from terminal 110 and/or server 130 (e.g., when server 130 sends payment information to transaction device 140 on behalf of terminal 110).

Clerk interface 516 may include hardware or software based logic that allows a clerk to interact with transaction device 140. For example, clerk interface 516 may include a keypad, keyboard, or other input device to allow the clerk to input information into transaction device 140, and/or an output device, such as a display device or printer, to provide information to the clerk.

Processing module 520 may include hardware or software based logic to process instructions related to performing transactions with terminal 110, server 130, third party 150, and/or user terminal 170, authenticating terminal 110 prior to a transaction, determining amounts due based on items included in a transaction, etc.

Storage module 530 may include hardware or software based logic to store information related to terminal 110, transactions performed with terminal 110, authentication information about terminal 110, etc.

Authentication module 540 may include hardware or software based logic to authenticate an identity of terminal 110. Authentication module 540 may operate with server 130, third party 150 and/or user terminal 170 when authenticating terminal 110. In one implementation, authentication module 540 may operate with mobile interface 514 to query terminal 110 for identifying information. Transaction device 140 may process identification information received from terminal 110 via authentication module 540 and/or processing module 520. In one implementation, transaction device 140 may send the identifying information to third party 150 or server 130 and may receive a result therefrom that indicates whether terminal 110 has been validated.

Near field communication module 550 may include hardware or software based logic to send information to terminal 110 and to receive information from terminal 110 via a near field communication link. Near field communication module 550 may include a near field transceiver that allows transaction device 140 to send information to terminal 110, such as an RFID query, and/or to receive information from terminal 110, such as a token. Near field communication module 550 may be an IEEE 802.x interface (e.g., a Bluetooth interface) and/or another type of interface that can communicate via free-space RF, optical, or acoustic waveforms. In one implementation, near field communication module 550 may exchange information with terminal 110 via encrypted packet-based or non-packet based transmissions.

RFID module 560 may include hardware or software based logic to allow transaction device 140 to send information, such as queries, to RFID logic operating in terminal 110. For example, RFID module 560 may be a plug-in module that can be installed on transaction device 140 to allow transaction device 140 to query terminal 110. Transaction device 140 may query terminal 110 when RFID module 560 senses the presence of terminal 110 (e.g., when terminal 110 is moved proximate to a reader related to RFID module 560). The query may initiate an exchange of authentication information between terminal 110 and transaction device 140 to establish a secure near field communication session with terminal 110.

Figure 5B:
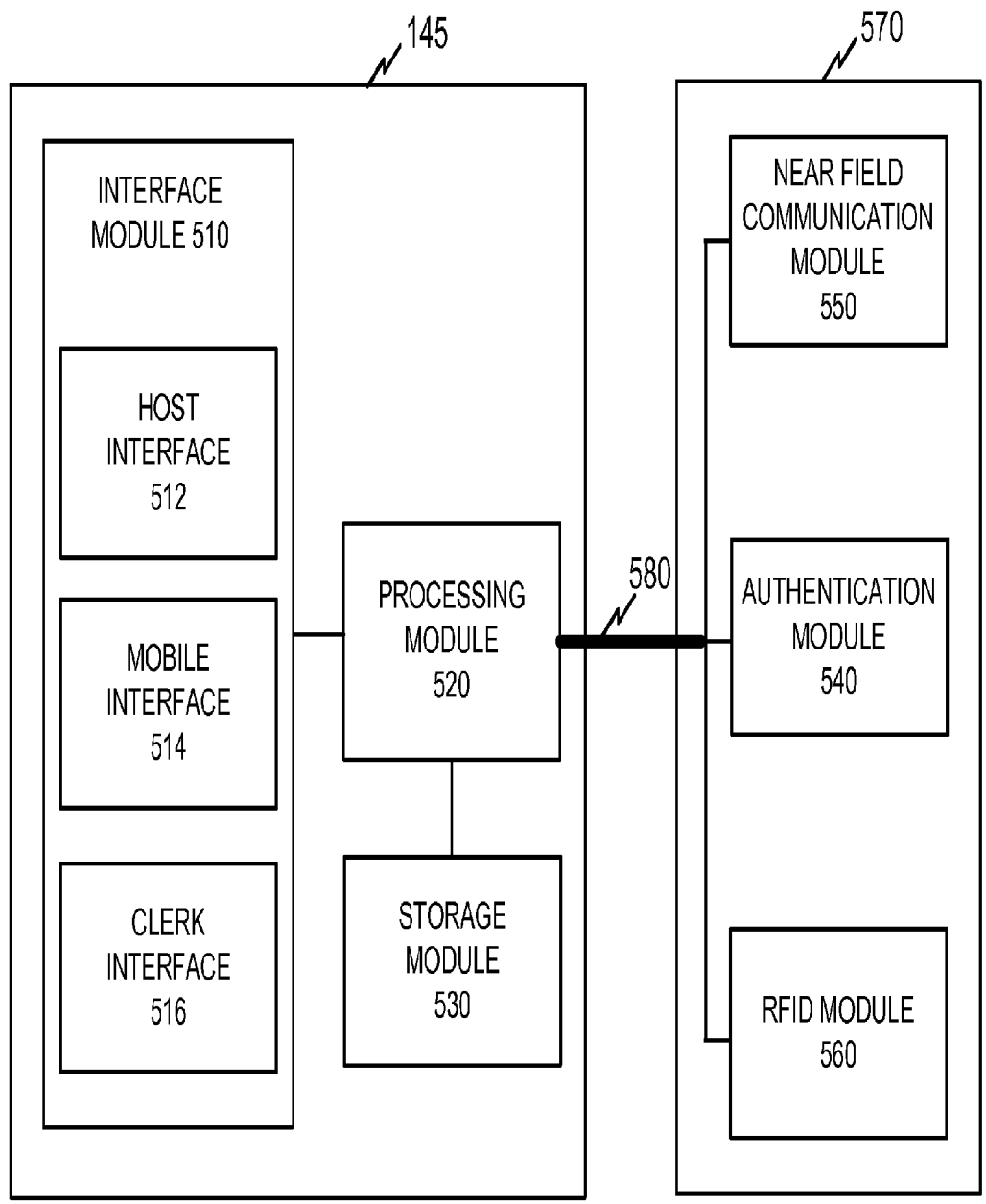

FIG. 5B illustrates an exemplary functional diagram of an alternative implementation of a transaction device, namely transaction device 145. Transaction device 145 may include interface module 510, processing module 520, storage module 530, authentication module 540, near field communication module 550, radio frequency identification (RFID) module 560, plug-in module 570 and interface 580. Interface module 510, processing module 520, storage module 530, authentication module 540, near field communication module 550, and radio frequency identification (RFID) module 560 may operate as described in connection with FIG. 5A.

Plug-in module 570 may include a structure adapted to hold one or more components that may operate with transaction device 145. For example, plug-in module 570 may include a housing that contains authentication module 540, near field communication module 550, and/or RFID module 560. Plug-in module 570 may be used to convert a device that cannot participate in secure near field communication sessions (e.g., a conventional electronic transaction device) into a device that can participate in secure near field communication sessions. For example, plug-in module 570 may include logic in a housing that can be plugged into a port on a conventional electronic cash register to allow the cash register to participate in secure near field transactions with terminal 110/111. In one implementation, plug-in module 570 may be used with register 145 (FIG. 1B). Alternative implementations of plug-in module 570 may be adapted to provide other devices, such as user terminal 150 and/or server 130, with near field communication capabilities.

Interface 580 may include a device that removeably couples transaction device 145 to plug-in module 570. Interface 580 may provide electrical and/or mechanical connectivity between transaction device 140 and plug-in module 570.

Figure 6:
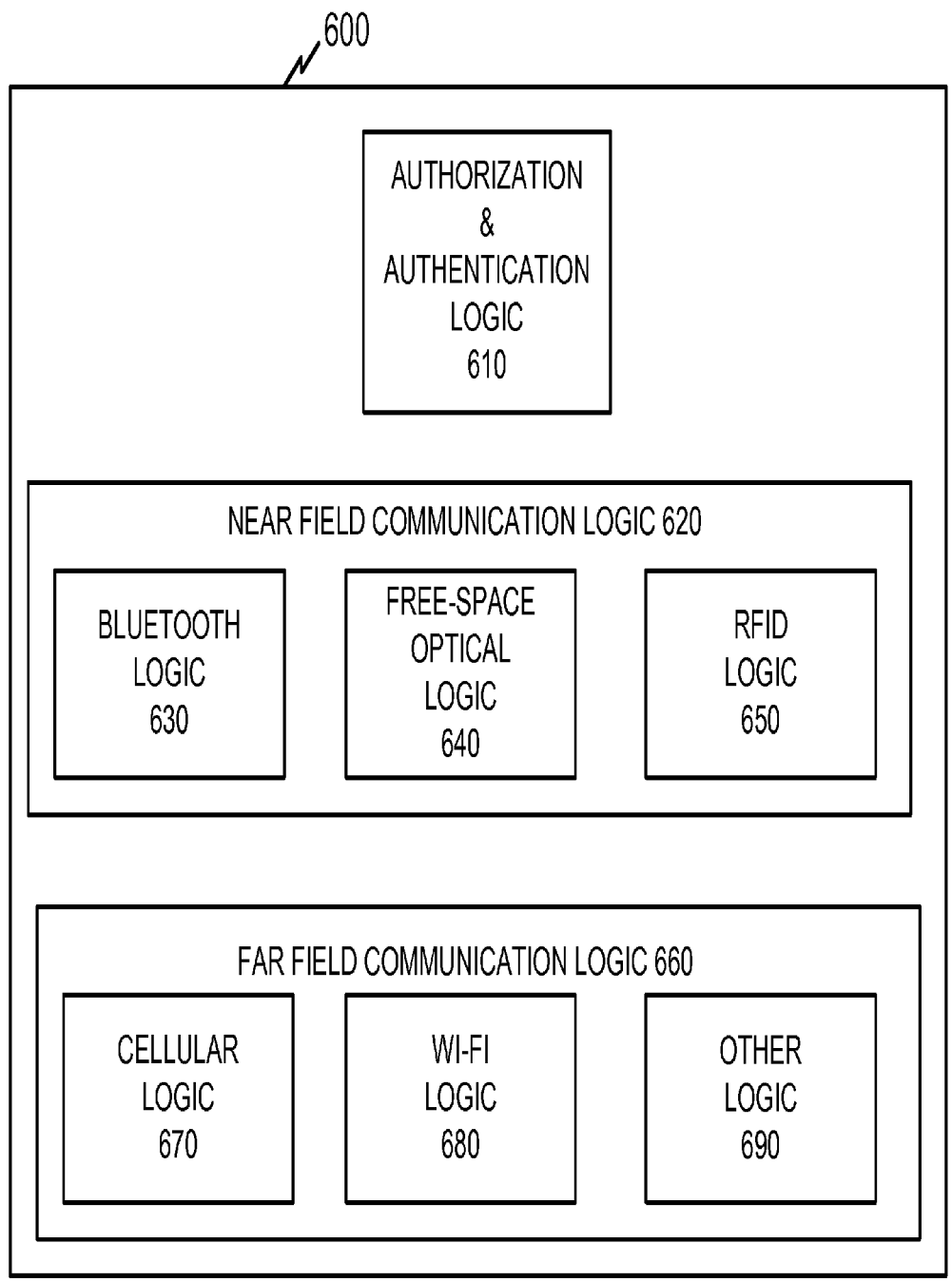
FIG. 6 illustrates an exemplary universal transaction module.

FIG. 6 illustrates an exemplary functional diagram of a universal module 600. Universal module 600 may include a module that can be used to provide one or more devices with near field and/or far field wireless communication capabilities. For example, universal module 600 may be adapted to plug into a non-wireless PDA to provide the PDA with secure near field and far field wireless capabilities. Alternatively, universal module 600 may be fastened and/or integrated into a device to provide near field and far field communication capabilities to the device.

An implementation of universal module 600 may include authorization and authentication logic 610, near field communication logic 620, and far field communication logic 660.

Authentication and authorization logic 610 may include hardware or software based logic that performs authentication, authorization, validation, and/or identification of a user and/or device (e.g., terminal 110, transaction device 140, user terminal 150, etc.) in system 100/101. Authentication and authorization logic 610 may generate and/or may operate with a user name, password, personal identification number (PIN), token, secure ID value, ESN, certificate, watermark, merchant identifier, transaction identifier, code (e.g., a script), etc. In one implementation, authentication and authorization logic 610 may use authentication and authorization information to perform security related functions on behalf of server 130.

Near field communication logic 620 may include hardware or software based logic to perform near field wireless communications. For example, an implementation of near field communication logic 620 may include Bluetooth logic 630 to establish Bluetooth links with devices, free-space optical logic 640 to establish free-space optical links with devices (e.g., infrared data association (IrDA) links), and RFID logic 650 to send and/or receive RFID queries to/from other devices. Near field communication logic 620 may send and/or receive encrypted or unencrypted wireless signals.

Far field communication logic 660 may include hardware or software based logic to perform far field wireless communications. For example, an implementation of far field communication logic 660 may include cellular logic 670 to establish cellular links with devices, Wi-Fi logic 680 to establish Wi-Fi links with devices, and/or other logic 690 to establish other types of links with devices (e.g., far field optical links). Far field communication logic 660 may send and/or receive encrypted and/or unencrypted signals.

FIG. 7 illustrates an exemplary implementation of an electronic receipt 700. Electronic receipt 700 may be generated via transaction device 140/register 145 and may be sent to terminal 110. In one implementation, terminal 110 may display items in receipt 700 as the items appear on a display of transaction device 140/register 145. Implementations of receipt 700 may be stored in data structures and/or via other techniques on terminal 110, server 130, transaction device 140/register 145 and/or other devices in system 100/101.

An implementation of receipt 700 can include store name 710, store ID 720, store location 730, transaction number 740, date 750, item ID 760, quantity 770, price 775, description 780, and total price 790. Store name may include a name of a store that is related to receipt 700, such as the name of a store where a transaction takes place. Store ID 720 may include information that identifies an entity that is involved in a transaction related to data structure 700, such as a store identified via store name 710. Store ID 710 may include a name, number, or other identifier.

Store location 730 may include information that identifies a location where a transaction related to receipt 700 takes place. For example, store location 730 may include an address of an establishment involved in a transaction with terminal 110. Transaction number 740 may include information that identifies a transaction. For example, a transaction number 740 may be used to identify a receipt that includes descriptions of items purchased during a transaction.

Date 750 may include information that identifies a date and/or time when a transaction occurred and/or when receipt 700 was created, modified, stored, etc. Item ID 760 may include information that identifies an item or service purchased, exchanged, or otherwise related to a transaction. For example, item ID 760 may include names of items purchased during a transaction. Quantity 770 may include information that identifies a number of items related to item ID 760 and/or quantity 770.

Price 775 may include information that identifies a cost related to an item identified by item ID 760. Description 780 may include information that describes an item identified by item ID 760. Total price 790 may include information that identifies a totaled value for receipt 700. For example, total 790 may include a value that represents the cost of items 760 included in receipt 700.

Figure 8:
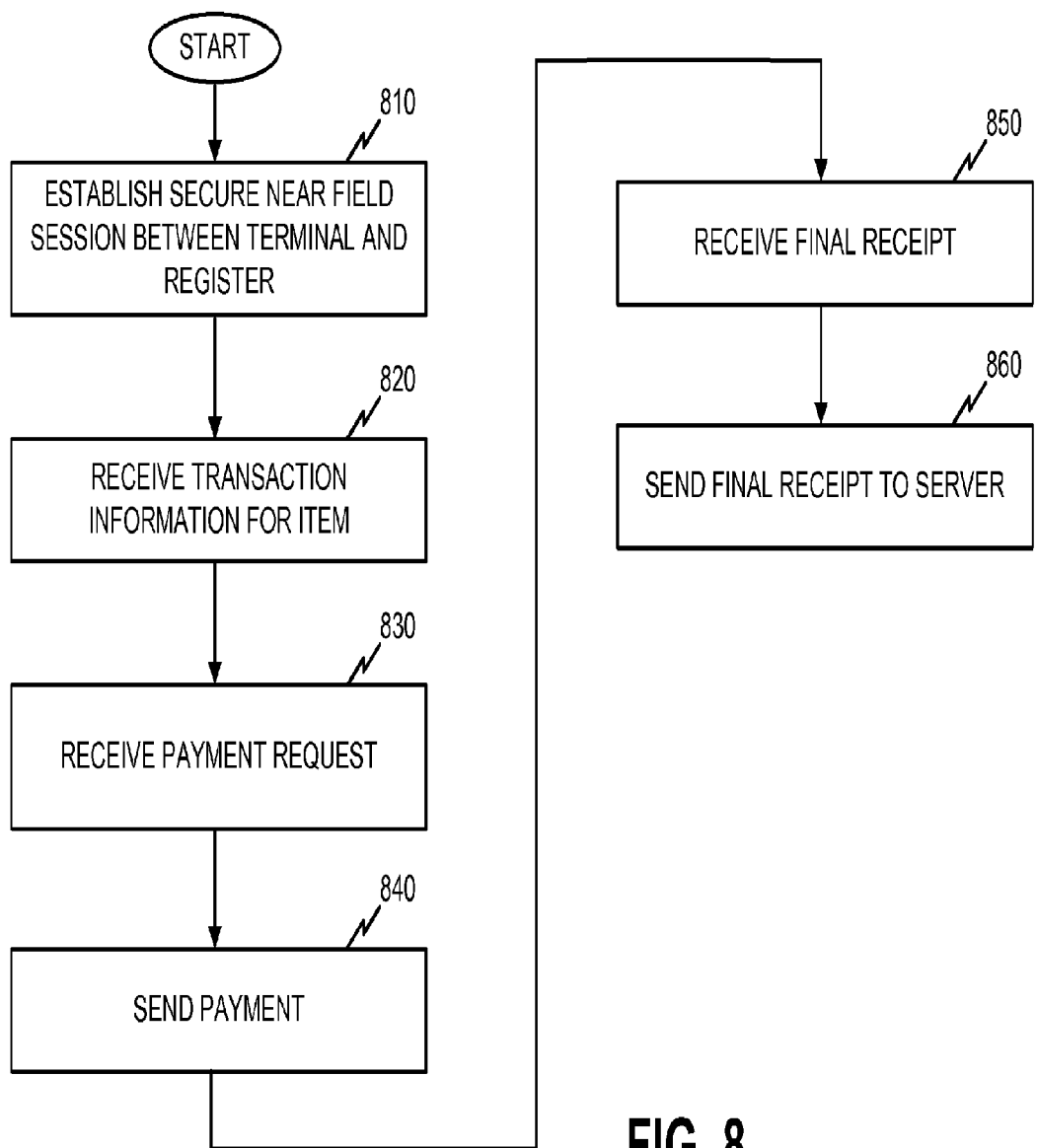
FIG. 8 illustrates exemplary processing for performing a transaction.

FIG. 8 illustrates exemplary processing for performing a transaction. Terminal 110 may be carried by a user in a store while shopping. The user may carry selected items to a register (e.g., transaction device 140) at the store to purchase the items. The user may pass his/her terminal 110 near a reader connected to the register. For example, the user may pass terminal 110 past an RFID reader connected to the register. The reader may sense terminal 110 and may send a query, such as an RFID query or a Bluetooth query to terminal 110. Terminal 110 may process the query using authentication logic 460 and may respond with identification information. For example, terminal 110 may send a SIV that includes an ESN for terminal 110, a token, and a PIN. The register may process the identification information using authentication module 540. Alternatively, the register may send the identification information to server 130, and server 130 may determine whether terminal 110 is a valid device (i.e., a device that can participate in a secure near field communication session with the register). Server 130 may return an authorization message to the register when terminal 110 is valid.

Terminal 110 and the register may establish a near field communication session when terminal 110 is validated (block 810). In one implementation, terminal 110 and the register may establish a Bluetooth session. In other implementations, terminal 110 and the register may communicate via other techniques, such as near field free-space optical signals and/or via hardwired links (e.g., by plugging terminal 110 into an interface on the register). The register may scan one or more items that are being purchased by the user of terminal 110.

Terminal 110 may receive transaction information related to an item being purchased (block 820). For example, the register may scan an item via a bar code reader. Information about the item (e.g., item name, price, etc.) may appear on a register display and the register may send a copy of the information to terminal 110 so that terminal 110 can display the same information. For example, the register may send transaction information, such as transaction information included in receipt 700, to terminal 110. Terminal 110 may receive updated information when additional items are scanned.

Terminal 110 may receive a payment request from the register when all items have been scanned and totaled (block 830). Terminal 110 may process the payment request and may send payment information to the register, or terminal 110 may send payment information to server 130 so that server 130 can send payment to the register on behalf of terminal 110. For example, terminal 110 may retrieve a credit card number and expiration date from a virtual wallet (e.g., a portion of storage 420 that stores electronic representations of information that a user may carry in a conventional wallet or billfold). Terminal 110 may send the credit card information to the register as payment (block 840). In another implementation, terminal 110 may send the retrieved payment information to server 130. Server 130 may process the payment information, such as by contacting third party 150 (e.g., a server operated by a credit card issuer and/or a bank). Server 130 may receive a payment from third party 150 and may send the payment to the register on behalf of terminal 110.

Terminal 110 may receive a final receipt (e.g., receipt 700) from the register (block 850). For example, the register may send a final receipt to terminal 110 when the register has received and processed the payment. Terminal 110 may store the final receipt in storage 420 (e.g., by storing the final receipt in a virtual wallet portion of storage 420). Terminal 110 may send a copy of the final receipt to server 130 for storage thereon (block 860).

Figure 9:
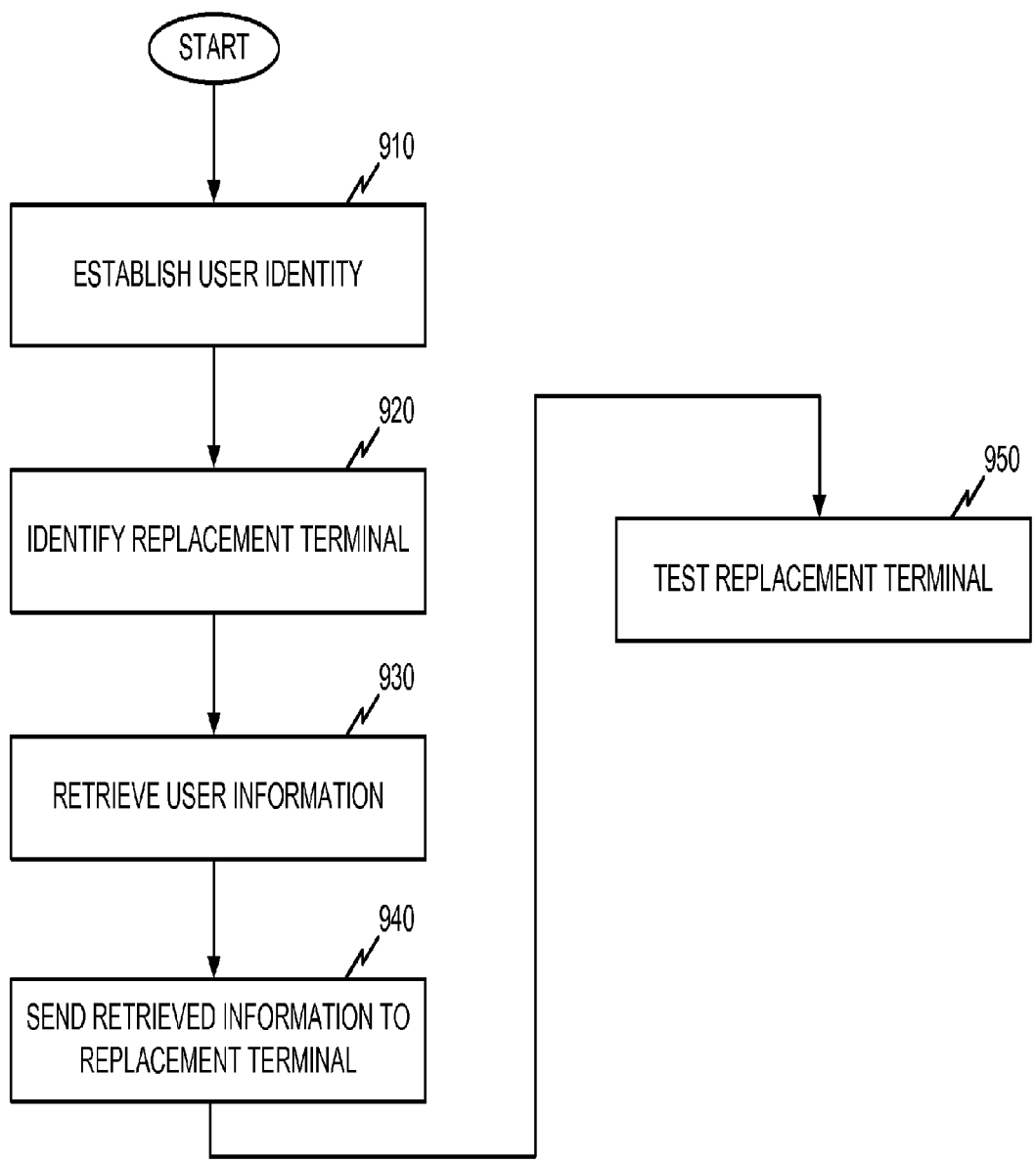
FIG. 9 illustrates exemplary processing for configuring a replacement mobile terminal.

FIG. 9 illustrates exemplary processing for configuring a replacement mobile terminal. Implementations may allow information related to a wireless device (e.g., terminal 110) to be copied onto another wireless device, such as a replacement cell phone, wireless PDA, laptop, etc., and/or onto another non-wireless device (e.g., a desktop computer). For example, server 130 may store a copy of information that is stored on terminal 110. In one implementation server 130 may store a copy of information that resides in a portion of storage 420 on terminal 110, such as information stored in a virtual wallet portion of storage 420. The virtual wallet may store information that terminal 110 uses for transactions, and/or other functions/applications. For example, the virtual wallet may store electronic representations of driver's license information for a user, bank account information, credit card information, automated teller machine (ATM) card information, medical information, contacts, coupons, electronic keys (e.g., house keys or car keys), call logs, electronic receipts, directions, shopping lists, documents, data files, music files, etc. Server 130 may store the contents of the virtual wallet on behalf of terminal 110 as part of a managed service provided by server 130.

Server 130 may establish the identity of a user related to terminal 110 (block 910). For example, a user may access server 130 via a browser page and may enter a user name, account number, and/or password. In an implementation, server 130 may validate the user via authorization module 340. Server 130 may identify a replacement terminal, such as terminal 111, for the user (block 920). For example, the user may have lost or broken his/her terminal 110 and may need a replacement terminal 111 so that the user can participate in near field transactions and/or perform other functions.

Server 130 may retrieve user information related to the user (block 930). For example, server 130 may retrieve the user's virtual wallet from subscriber database 357 in storage module 350. In one implementation, the user may select information that will be copied to terminal 111 via a user interface, e.g., a browser page, related to server 130.

Server 130 may send the retrieved information to the replacement terminal (block 940). For example, server 130 may send the retrieved information to terminal 111. Terminal 111 may include all of the information in the user's virtual wallet or a portion of the information, depending on the user's preferences.

Server 130 may test the replacement terminal (block 950). For example, server 130 may run a test script that contacts terminal 111. Server 130 may participate in a simulated transaction with terminal 111 and/or may perform other operations with terminal 111 to ensure that terminal 111 operates in a manner similar to that of terminal 110.

Exemplary implementations may be implemented in forms other than those described above. For example, a first implementation may operate server 130 as a master device and one or more terminals 110/111 or user terminals 170 as slave devices. The master device may receive updates from slave devices anytime information on a slave device is updated. For example, a user may perform a web-based transaction via user terminal 170 and may store interim and/or final transaction information in a storage device on user terminal 170. User terminal 170 may be configured to push new content to server 130, where server 130 stores the pushed content in an account related to user terminal 170 and/or a user of user terminal 170. Server 130 may provide the user's information to substantially any type of device that is related to the user. For example, the user may access his/her information via a computer operated at a hotel where the user may be staying.

A second implementation may allow conventional devices, such as a conventional electronic cash register, to be modified so that the conventional devices can participate in transactions with terminal 110/111 and/or server 130. For example, an adapter may include the logic of FIG. 6. The adapter may plug into a port, a bus, and/or another type of interface device on a conventional device (e.g., a conventional electronic cash register) and/or another type of device. The adapter may provide the cash register with RFID scanning capabilities, near field wireless communication capabilities (e.g., Bluetooth), far field wireless capabilities (e.g., Wi-Fi), and/or hardwired network connectivity (e.g., via a network interface card). Still other implementations may take other forms.

CONCLUSION

Implementations may allow for secure near field wireless transactions between a mobile terminal and a register. Implementations may further provide non-wireless devices with a plug-in capability that allows the devices to participate in secure near field wireless transactions.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations can be implemented using devices and configurations other than those illustrated in the figures and described in the specification without departing from the spirit of the invention. Devices and/or components may be added and/or removed from the implementations of FIGS. 1-6 depending on specific deployments and/or applications. Further, disclosed implementations may not be limited to any specific combination of hardware, software and/or firmware. In addition, while a series of acts has been described with respect to FIGS. 8-9 the order of acts in FIGS. 8-9 may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile communication device comprising:
a memory to store instructions;
one or more processors configured to execute the instructions to:
receive a query generated by a transaction device based on a proximity of the mobile communication device to the transaction device;
send, responsive to the query, identity information to a server via a network;
receive, from the server via the network and based on the identity information, transaction information including:
a transaction identifier and a merchant identifier corresponding to at least one purchase transaction completed between a user of the mobile communication device and a user device associated with the merchant identifier, and
information identifying merchants that are authorized to participate in near field transactions with the mobile communication device;
send, to the transaction device via a near field wireless link, at least some of the transaction information to establish a communication session to conduct a purchase transaction between the transaction device and the mobile communication device; and
receive, from the transaction device via the near field wireless link, a payment request associated with the purchase transaction between the transaction device and the mobile communication device, and generated using the transaction information provided by the server.

2. The mobile communication device of claim 1, wherein the one or more processors are further configured to execute the instructions to:
retrieve, responsive to the payment request, payment information corresponding to the purchase transaction between the transaction device and the mobile communication device; and
send the payment information to the server to provide payment corresponding to the payment request.

3. The mobile communication device of claim 2, wherein the one or more processors are further configured to execute the instructions to:
receive, from the transaction device, a receipt indicative of the provided payment; and
send a copy of the receipt to the server.

4. The mobile communication device of claim 1, wherein the user device comprises the transaction device, and the at least one purchase transaction comprises a plurality of purchase transactions between the mobile communication device and the transaction device conducted prior to the purchase transaction between the transaction device and the mobile communication device.

5. The mobile communication device of claim 1, wherein the transaction information further comprises identification of items purchased, quantities of the items purchased, sizes, shapes, or styles of the items purchased, and date or time information related to the at least one purchase transaction.

6. The mobile communication device of claim 1, wherein the one or more processors are further configured to execute the instructions to:
receive, from the transaction device during the purchase transaction between the transaction device and the mobile communication device, transaction data presented via a display of the transaction device; and
display the transaction data during the purchase transaction between the transaction device and the mobile communication device.

7. A method performed in a transaction device, comprising:
sensing, by the transaction device, a presence of a mobile communication device within a particular proximity of the transaction device;
generating, based on the sensing, a query requesting information;
sending, via a near field wireless link, the query to the mobile communication device;
receiving, from the mobile communication device via the near field wireless link and responsive to the query, the information including a transaction identifier and a merchant identifier corresponding to transaction information stored on a server, wherein the transaction information is associated with at least one purchase transaction completed between a user of the mobile communication device and a user device associated with the merchant identifier;
establishing, via the near field wireless link, a communication session to conduct a purchase transaction between the transaction device and the mobile communication device;
sending, via a network, a request to the server;
receiving, via the network and responsive to the request, the transaction information from the server;
generating, using the transaction information, a payment request corresponding to the purchase transaction between the transaction device and the mobile communication device; and
sending, to the mobile communication device via the near field wireless link, the payment request.

8. The method of claim 7, further comprising:
receiving, from the server, a payment corresponding to the payment request;
generating a receipt indicative of the payment; and
sending the receipt to the mobile communication device.

9. The method of claim 7, wherein the user device comprises the transaction device, and the at least one purchase transaction comprises a plurality of purchase transactions between the user of the mobile communication device and the transaction device conducted prior to the purchase transaction between the transaction device and the mobile communication device.

10. The method of claim 7, wherein the received information further comprises identification of items purchased, quantities of the items purchased, sizes, shapes, or styles of the items purchased, and date/time information related to the at least one purchase transaction.

11. The method of claim 7, further comprising:
providing, to the mobile communication device during the purchase transaction between the transaction device and the mobile communication device, data associated with the transaction for presentation via a display of the mobile communication device; and
displaying, during the transaction between the transaction device and the mobile communication device, the data associated with the purchase transaction via a display of the transaction device.

12. A method performed in a server, comprising:
sending, to a mobile communication device via a wireless network and responsive to a presence of the mobile communication device within a sensed proximity of a transaction device, information including merchants authorized to participate in near field transactions with the mobile communication device, a transaction identifier and a merchant identifier corresponding to transaction information stored on the server, wherein the transaction information is associated with at least one purchase transaction completed between a user of the mobile communication device and a user device associated with the merchant identifier;

receiving, from the transaction device via a data network, a request based on the sent information and relating to a purchase transaction between the mobile communication device and the transaction device; and sending, to the transaction device responsive to the request, the transaction information for conducting the purchase transaction between the mobile communication device and the transaction device.

13. The method of claim 12, wherein the sent information further comprises identification of items purchased, quantities of the items purchased, sizes, shapes, or styles of the items purchased, and date or time information related to the at least one purchase transaction.

14. The method of claim 12, further comprising:
receiving, from the transaction device, a payment request corresponding to the purchase transaction;
receiving, from the mobile communication device, payment information corresponding to the purchase transaction; and
providing, to the transaction device, payment corresponding to the payment request.

15. The method of claim 14, further comprising:
receiving, from the mobile communication device, a copy of a receipt indicative of the provided payment; and
storing the receipt with the transaction information.

16. The method of claim 12, wherein the user device comprises the transaction device, and the at least one purchase transaction comprises a plurality of purchase transactions between the user of the mobile communication device and the transaction device conducted prior to the purchase transaction between the mobile communication device and the transaction device.

17. The method of claim 12, further comprising:
performing, based on the request, authorization of the mobile communication device; and
sending, to the transaction device, an authorization message indicative of a result of the authorization.

18. The method of claim 12, wherein the method is implemented as a managed service, based on a subscription, to at least one of:
a user of the mobile communication device,
the transaction device, or
the user device.

* * * * *